Jan. 11, 1949.   M. HITZELHAMMER   2,458,705
LOCKING MECHANISM FOR JIGS AND THE LIKE
Filed Feb. 22, 1945   2 Sheets-Sheet 1
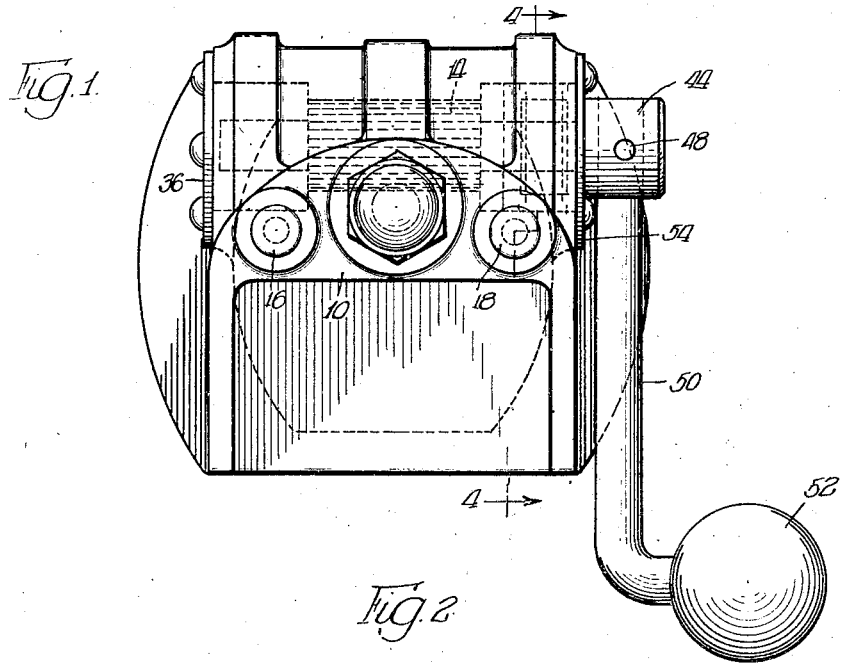
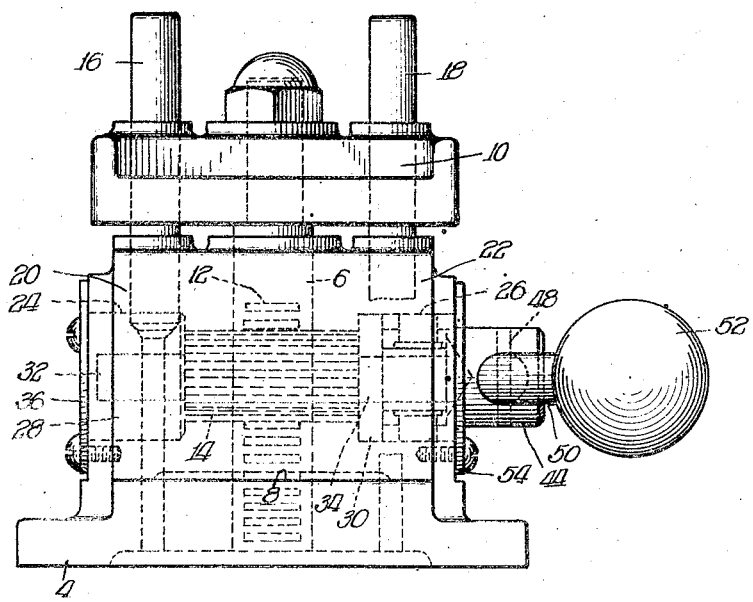
INVENTOR.
Mathew Hitzelhammer,
BY Jan. 11, 1949.  M. HITZELHAMMER  2,458,705
LOCKING MECHANISM FOR JIGS AND THE LIKE
Filed Feb. 22, 1945  2 Sheets-Sheet 2
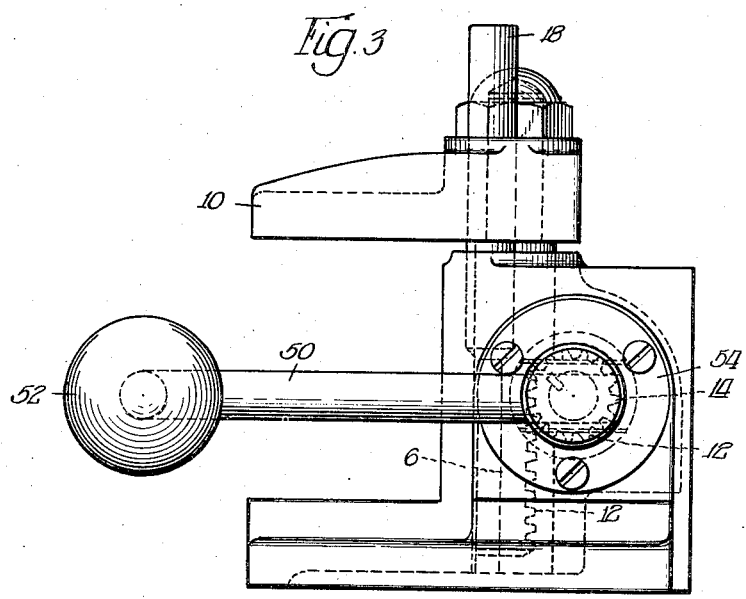
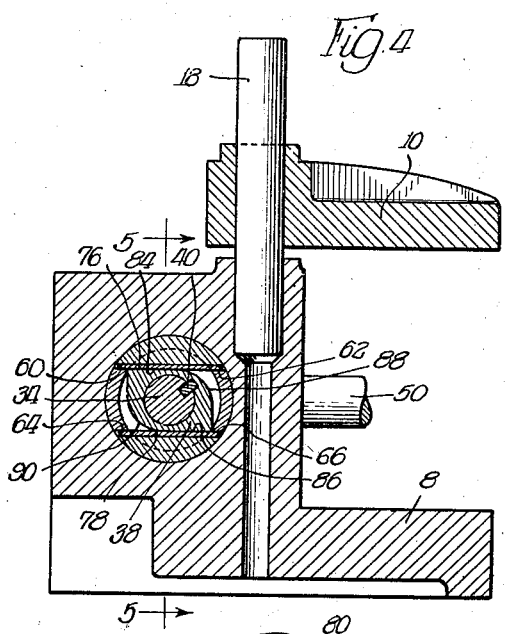
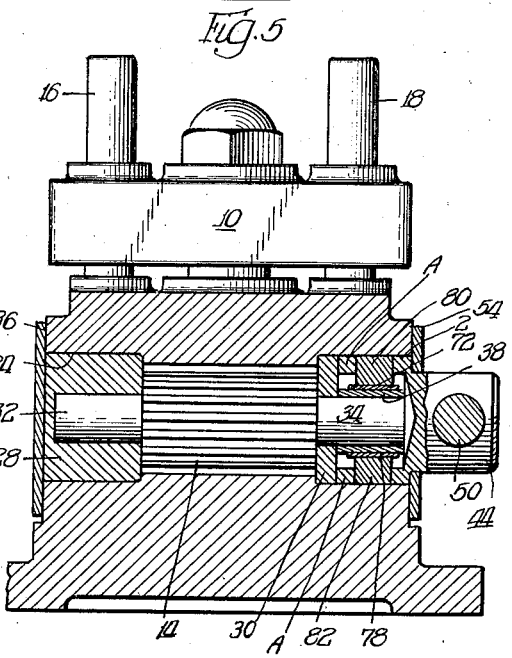
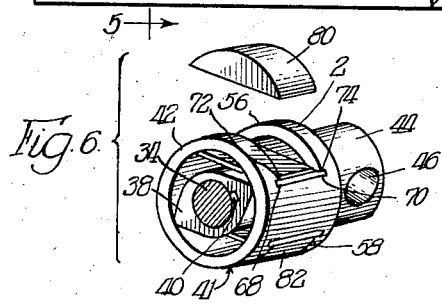
INVENTOR.
Mathew Hitzelhammer,
BY Patented Jan. 11, 1949

2,458,705

UNITED STATES PATENT OFFICE 2,458,705

LOCKING MECHANISM FOR JIGS AND THE LIKE

Mathew Hitzelhammer, Highland Park, Mich., assignor to Domestic Industries, Inc., Chicago, Ill., a corporation of Delaware Application February 22, 1945, Serial No. 579,278

7 Claims. (Cl. 192—8)

1

The present invention relates to locking devices and more in particular to locking devices for clamping drill jigs and the like.

Among the objects of the present invention is to provide a novel shaft actuating and locking mechanism of simple construction, easily manufactured and readily installed in such equipment as clamping drill jigs and the like, and which provides a direct drive for a shaft when operated in one direction and which serves to provide a positive lock for the shaft when moved in another direction.

Still another object of the present invention is to provide a novel shaft actuating and locking device in which practically no back-lash is present so that the same is directly moved from locking to actuating position, or vice versa, with little effort and with a positive locking or driving for the shaft under all working conditions.

The present invention also has as an object the idea of providing a novel shaft actuating and locking device of simplified construction which when in its locked condition will not release under chatter.

Still a further object of the present invention is to provide a novel shaft actuating and locking mechanism which can be readily incorporated in a drill jig or the like in such a position as to be usable either as a right or left handed operated mechanism.

Other objects, features, capabilities and advantages are comprehended by the invention, as will later appear and as are inherently possessed thereby.

Referring now to the drawings—

Figure 1 is a top plan view of a drill jig incorporating mechanism made in accordance with the present invention;

Figure 2 is a view in rear elevation of the drill jig shown in Figure 1 of the drawings;

Figure 3 is a view in side elevation of the drill jig shown in Figures 1 and 2 of the drawings;

Figure 4 is a view in cross section taken in the plane represented by line 4—4 of Figure 1 of the drawings;

Figure 5 is a view in cross section taken in the plane represented by line 5—5 of Figure 4 of the drawings; and Figure 6 is a detached exploded view in perspective of a shaft actuating and locking device made in accordance with the present invention.

Referring now more in detail to the drawings, a shaft actuating and locking device generally represented as 2 in Figure 6 of the drawings is shown as being embodied in a drill jig comprising a base 4 formed with a hollow 6 and a laterally extending fixed clamping element 8 forming a part of said base. Operatively associated with the fixed clamping member 8 is a movable clamping element 10 oppositely disposed with respect to the fixed clamping element 8 and provided with a depending rack 12 extending into the hollow 6 and meshing with gear teeth provided on the central portion of a shaft 14. Oppositely arranged with respect to the rack 12 are the guide elements 16 and 18 extending above the base 4 and being received within openings of the movable clamping member 10 for guiding the same upon relative movement with respect to the fixed clamping member 8.

As shown more particularly in Figure 2 of the drawings, the base 4 includes the side walls 20 and 22 provided with recesses 24 and 26, respectively, the former having a journal bearing 28 mounted therein and the latter having the journal bearing 30 mounted therein adapted to receive the reduced end sections 32 and 34 respectively of the shaft 14. Bearing member 28 is retained in position through the medium of a cover plate 36 secured to the outer side wall 20. Disposed within the recess 26 and adjacent the journal bearing 30 is disposed the shaft actuating and locking device 2 whereby the shaft 14 is actuated for moving the clamping member 10 and for locking said shaft together with the clamping member 10 in any desired position.

The present invention is more particularly directed to the novel structure for the shaft actuating and locking device 2 and while the same is shown in connection with the shaft 14 for a drill jig, nevertheless the same has varied uses and all of such uses are contemplated by the present invention.

More particularly, the assembly as shown in Figure 6 comprises a cam member 38 keyed as at 40 to the reduced end section 34 of the shaft 14. Disposed within the recess 26 and in embracing relation to the cam 38 is a housing or retainer member 41 having an enlarged hollow cylindrical part 42 and a solid reduced section 44 provided with an opening 46 therethrough which is adapted to have secured therein by means of a pin or the like 48 an operative lever 50 having a knob 52 at its outer end adapted to be gripped by an operator for rotating the housing 41 clockwise or counterclockwise as desired for the purposes to be hereinafter more fully set forth. The actuating and locking device 2 is retained in position within the recess 26 by means of a cover plate 54 apertured to receive the reduced section 44 of housing 41 but of such a size that the cover plate 54 abuts the shoulder intermediate the hollow section 42 and the reduced section 44.

In accordance with the embodiment disclosed herein, the hollow cylindrical housing section 42 is provided with peripheral slots 56 and 58, the former being defined in part by the opposed wall surfaces 60 and 62 and the latter of which is defined in part by the opposed wall surfaces 64 and 66. Surfaces 60 and 62 lie substantially within a plane spaced from the axis of the housing member 41 and surfaces 64 and 66 are likewise disposed in a plane spaced from the axis of the housing 41 and which planes are substantially parallel with one another. Adjacent each of the surfaces 60, 62, 64 and 66 are the laterally arranged slots 68 and 70 forming shoulders 72 and 74. Extending between the wall surfaces 60 and 62 is a leaf spring 76 and extending between the surfaces 64 and 66 is a leaf spring 78 of similar construction, the said leaf springs in each instance extending within the slots 68 and 70 and being disposed in opposed relation to the shoulders 72 and 74. Operatively positioned within the slots 56 and 58 are shoes 80 and 82, respectively, having outer curved surfaces whose radius of curvature is substantially the same as the radius of curvature for the outer surface of housing section 42 and which shoes 80 and 82 are adapted to be moved into engaging relation with the wall surface defining the recess 26.

As clearly shown in Figure 4 of the drawings, the cam element 38 is positioned between the leaf springs 76 and 78 and is shown in that figure as having operative association with the housing section 42 such that shaft 14 is rotated when the housing section 42 is rotated in a counterclockwise direction by the operating lever 50. This transmission of rotary movement is effected through the cam surfaces 84 and 86 disposed substantially diametrically in opposed relation to one another and engaging the leaf springs 76 and 78 substantially adjacent the surfaces 60 and 66. Accordingly, upon rotation of operating lever 50, rotary movement of shaft 14 is effectively obtained through the medium of the housing section 42, shoulders 68 and 70, springs 76 and 78, and the cam 38. Such rotary movement raises the rack 22 and the movable clamping member 10 connected thereto to such a position as to accommodate the work at hand.

After the clamping member 10 has been raised a desired distance above the clamping member 8, the work may be introduced into the same and the operating handle 50 rotated in the opposite direction to move the housing section 42 clockwise as viewed in Figure 4 of the drawings whereby the clamping member 10 is moved into engagement with the work. Further movement of the handle 50 causes further movement of the housing section 42 in a clockwise direction until such time as the clamping member 10 is in firm engagement with the work to hold the same in working position, after which further rotation of housing section 42 causes the springs 76 and 78 to come into engagement with opposed cam surfaces 88 and 90 provided on the cam member 38. These cam surfaces are so constructed and arranged as to move the springs 76 and 78 outwardly to force the shoes 80 and 82 into engagement with the wall of recess 26, thus effectively locking the shaft 14 against movement and accordingly preventing a loosening of clamping member 10 with respect to the work.

When the work has been completed, the movement of operating handle 50 in the opposite direction causes the housing section 42 to be rotated in a counterclockwise direction as viewed in Figure 4 of the drawings, at which time spring elements 76 and 78 resume their former position in substantially parallel planes thus releasing jaws 80 and 82 which resume their normal position within the slots 56 and 58 after which the operating handle 50 can be rotated to raise clamping member 10 to release the work and condition the device for the next operation.

With a shaft actuating and locking device of the structure herein disclosed, positive driving and locking of the shaft 14 is assured and the clamping member 10 cannot become loose by chattering to release the work. It is to be further noted that recesses 24 and 26 are of the same size and formation so that the shaft actuating and locking mechanism may be introduced into recess 24 if it is desired to change the device from a right hand operated device to one which is operated in the reverse manner.

While I have herein described and upon the drawings shown an illustrative embodiment of the invention, it is to be understood that the invention is not limited thereto but may comprehend other constructions, arrangements of parts, details and features without departing from the spirit of the invention.

What is claimed is:

1. The combination of a shaft, means providing journals for said shaft including a wall structure having a recess adjacent one end of said shaft, actuating means for controlling the operation of said shaft comprising a cam fixed to said shaft, an housing mounted within said recess in embracing relation to said cam, said housing having at least one shoe movably mounted therein, and a spring element secured to said housing and interposed between said cam and said shoe, said cam having engagement with said spring in either direction of rotation of said housing for rotating said shaft and having a cam surface engageable with said spring to move said shoe outwardly into engagement with the wall of said recess to lock said shaft against movement when said housing and cam are rotated in one direction relative to each other.

2. The combination of a shaft, means providing journals for said shaft including a wall structure having a recess adjacent one end of said shaft, actuating means for controlling the operation of said shaft comprising a cam fixed to said shaft, an housing mounted within said recess in embracing relation to said cam, said housing having at least one peripheral slot, a shoe movably mounted in said slot, and a spring element secured to said housing and interposed between said cam and said shoe, said cam having engagement with said spring in either direction of rotation of said housing for rotating said shaft and having a cam surface engageable with said spring to move said shoe outwardly into engagement with the wall of said recess to lock said shaft against movement when said housing and cam are rotated in one direction relative to each other.

3. The combination of a shaft, means providing journals for said shaft including a wall structure having a recess adjacent one end of said shaft, actuating means for controlling the operation of said shaft comprising a cam fixed to said shaft, an housing mounted within said recess in embracing relation to said cam, said housing having at least one peripheral slot defined in part by spaced surfaces disposed in substantially a plane spaced from the axis of said housing, a shoe movably mounted in said slot, and a spring element having shouldered engagement with said housing adjacent said surfaces and interposed between said cam and said shoe, said cam having engagement with said spring adjacent one of said surfaces in either direction of rotation of said housing for rotating said shaft and having a cam surface engageable intermediate the ends of said spring to move said shoe outwardly into engagement with the wall of said recess to lock said shaft against movement when said housing and cam are rotated in one direction relative to each other.

4. The combination of a shaft, means providing journals for said shaft including a wall structure having a recess adjacent one end of said shaft, actuating means for controlling the operation of said shaft comprising a cam fixed to said shaft, an housing mounted within said recess in embracing relation to said cam, said housing having at least one peripheral slot defined in part by spaced surfaces disposed in substantially a plane spaced from the axis of said housing, a shoe movably mounted in said slot, laterally extending slots adjacent said surfaces providing abutment shoulders, and a spring element extending between said surfaces and having abutting engagement with said shoulders, said cam having engagement with said spring adjacent one of said surfaces in either direction of rotation of said housing for rotating said shaft and having a cam surface engageable intermediate the ends of said spring to move said shoe outwardly into engagement with the wall of said recess to lock said shaft against movement when said housing and cam are rotated in one direction relative to each other.

5. A shaft actuating and locking device according to claim 3, wherein said recess and housing are substantially cylindrical shape and said shoe has an outer surface forming a continuation of the outer surface of said housing.

6. A shaft actuating and locking device according to claim 4, wherein said recess and housing are substantially cylindrical shape and said shoe has an outer surface forming a continuation of the outer surface of said housing.

7. The combination of a shaft, means providing journals for said shaft including a wall structure having a recess adjacent one end of said shaft, actuating means for controlling the operation of said shaft comprising a cam fixed to said shaft, an housing mounted within said recess in embracing relation to said cam, said housing having oppositely disposed peripheral slots each defined in part by spaced surfaces disposed in planes substantially in parallel relation and spaced from the axis of said housing, shoes movably mounted in said slots, laterally extending slots adjacent said surfaces providing abutment shoulders, and spring elements extending between the surfaces of each slot and having abutting engagement with said shoulders, said cam having engagement with said springs in diagonally opposed relation in either direction of rotation of said housing for rotating said shaft and having opposed cam surfaces engageable intermediate the ends of said springs to move said shoes outwardly into engagement with the wall of said recess to lock said shaft against movement when said housing and cam are rotated in one direction relative to each other.

MATHEW HITZELHAMMER.

REFERENCES CITED

The following references are of record in the file of this patent:

UNITED STATES PATENTS

| Number | Name | Date |
|---|---|---|
| 1,607,907 | Myers | Nov. 23, 1926 |
| 1,805,443 | Walters et al. | May 12, 1931 |
| 1,855,939 | Collins | Apr. 26, 1932 |
| 2,051,400 | Taylor | Aug. 18, 1936 |
| 2,371,442 | Hammond | Mar. 13, 1945 |